Oct. 31, 1961 L. G. MAMAS 3,006,225
SPECIAL MILL CONTROLS
Filed July 8, 1957 2 Sheets-Sheet 1
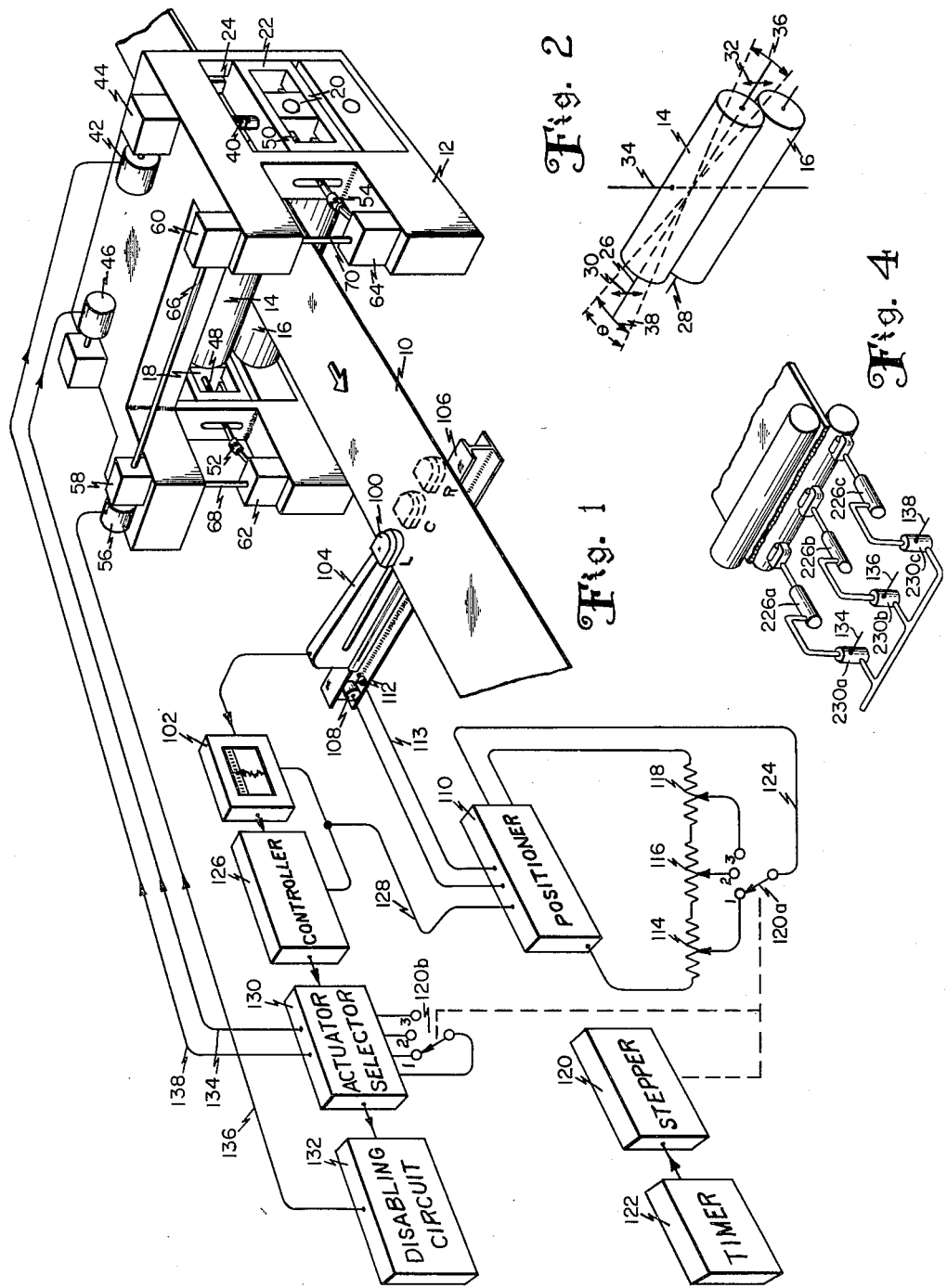
INVENTOR
LEO G. MAMAS

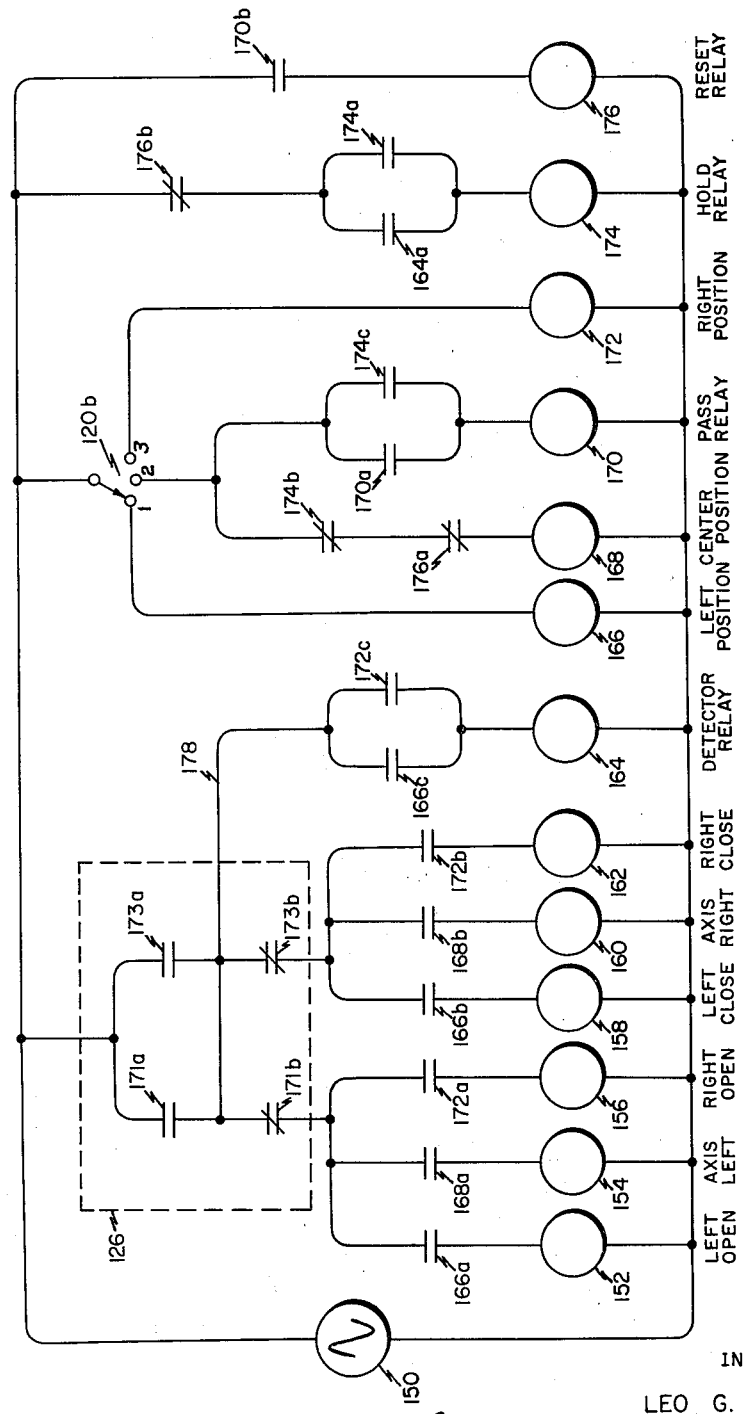

United States Patent Office 3,006,225
Patented Oct. 31, 1961

3,006,225
SPECIAL MILL CONTROLS
Leo G. Mamas, Columbus, Ohio, assignor to Industrial
Nucleonics Corporation, a corporation of Ohio
Filed July 8, 1957, Ser. No. 670,572
6 Claims. (Cl. 80—56)

This invention relates generally to a system for automatically controlling the thickness of a material strip issuing from a rolling mill or calender machine, and more particularly it relates to a system for automatically controlling the settings of a machine equipped with a strip thickness profile adjustment, such as a roll cross-axis adjustment, as well as independent right and left roll screwdown adjustments so as to maintain constant the desired thickness profile of the strip under a variety of different operating conditions.

The development of machines having provision for a profile adjustment such as a cross-axis adjustment and the adoption of the same by the industries has been effected only rather recently. The need therefor is apparent in retrospect because of the fact that the central portions of opposed mill rolls are distorted under pressure of the strip passing therethrough and tend to spring apart, whereas the end portions are journaled rather rigidly in place. For this reason it was long the practice to crown the rolls in the grinding thereof so that the central portions were of greater diameter than the terminal portions so as to compensate for the pressure distortion and thereby prevent this effect from causing the production of a material strip which was undesirably thicker in the center than at the edges. However, any calculated degree of crowning could only provide partial compensation, due to the fact that changes in the thickness or plasticity of the stock produced changes in the amount of pressure between the rolls and a correspondingly different degree of distortion, so that proper compensation was effected only under certain optimum conditions which could seldom be maintained.

Rather than restricting all relative movement of the roll axes to a common plane, a machine having provision for cross-axis adjustment permits the axis of one roll to be rotated in a second plane generally perpendicular to the first plane, in a manner such that the degree of separation between the ends of the rolls may be changed while maintaining a substantially constant separation at the central portion thereof. Hence by a proper sequence of adjustments to the right-hand screwdown, left hand screwdown and cross-axis setting, the thickness profile of the strip can be corrected for a variety of changes in the specification thickness, the plasticity of the stock or the desired handling characteristics of the final sheet which are affected by profile variations across the width thereof.

Feedback control techniques per se for automatically regulating screwdown have long been known to the industries, as is evidenced, for example, by U.S. Patent No. 1,969,536, issued in 1934 to H. A. Winne. Commonly, twin gauges and associated controllers are used to independently measure and control the thickness of the strip at each edge thereof by automatically adjusting the right and left screwdown mechanisms. The suggestion presents itself that a third gauge and controller could be added to measure the center of the sheet and automatically control the cross-axis setting. However, in addition to the expense of additional duplication of rather expensive equipment, difficulties arise due to the fact that the material thickness at the center of the strip is not necessarily affected at all by a change in the cross-axis adjustment itself, so that in the case of the third gauge-controller per se the feedback loop cannot be closed. On the other hand, it is the thickness at the edges of the strip which is immediately altered by a change in the cross-axis setting. Hence the effect of an adjustment thereto cannot be determined until subsequent right and left screwdown adjustments have been made to restore the edge thickness to the correct value, so that rather complicated interlocking circuitry interconnecting the various controllers might be required to prevent runaway action of the cross-axis controller and to insure that the automated adjustments would be performed in the correct sequence.

In accordance with this invention, it has been found that very effective and reliable control of a machine as described can be obtained using a relatively simple and economical system wherein a single gauge provided with a traversing mount is automatically positioned in sequence at points near the two edges and the center of the strip while the output of an associated controller is automatically transferred to the proper machine adjusting actuator in synchronism with the positioning of the gauge. Circuit interlocking means are provided whereby an adjustment to the cross-axis setting is not permitted until the strip thickness at both edges is correct.

It is an object of this invention to provide an automatic system for controlling the profile thickness of a material strip issuing from a calendar, rolling mill or the like which is equipped with both screwdown and profile control adjustments such as a cross-axis adjustment.

It is a further object to provide a system for automatically effecting coordinated corrective adjustments to a mill having plural adjusting actuators as described, by the use of a single gauging and controlling device.

It is another object to provide an actuator selector system for channeling controller output signals sequentially to a plurality of actuators, said system including disabling means to prevent operation of a selected actuator until prerequisite adjustments have been made.

Further objects and advantages of the invention will become apparent in the following detailed description thereof, with reference to the appended drawings, in which:

FIG. 1 is a perspective showing, partly in schematic, of the elements of a typical industrial process having automatic strip thickness profile control apparatus associated therewith in accordance with this invention.

FIG. 2 is a diagram illustrating typical geometry of the roll adjustments automatically effected by the control system of the invention.

FIG. 3 is a diagram showing illustrative circuitry of an actuator selector and controller disabling means suitable for carrying out certain control functions in accordance with the invention.

FIG. 4 illustrates a portion of another well-known apparatus having strip thickness profile control means, showing the manner in which the control system of the present invention may be incorporated therein.

Referring to FIG. 1, a material sheet 10 is shown issuing from a mill 12 after undergoing reduction and/or forming between a pair of co-acting rolls 14 and 16 thereon. The roll 16 is journaled for rotation about a stationary axis. The adjustable roll 14, however, is journaled for rotation about a movable axis, being supported at its ends on suitable bearings mounted in bearing blocks 18 and 20. Each of the bearing blocks 18 and 20 is in turn slideably mounted in horizontally disposed ways provided in a corresponding pair of shuttle blocks as at 22 which in turn are slideably mounted in vertically disposed ways provided in the mill end-housings as at 24. This arrangement permits positioning of the roll axis in a manner depicted more clearly in FIG. 2.

Referring to FIG. 2, rolls 14 and 16 of FIG. 1 are represented as a pair of cylinders having central axes 26 and 28; the axis 28 of roll 16 being stationary while axis 26 of roll 14 is movable. Either end of roll axis 26 is independently adjustable up or down as is indicated by the double-pointed arrows 30 and 32. There is also shown a vertical axis 34 intersecting the axis 26 which bisects the length of roll 14 and around which the axis 26 of roll 14 may pivot in a horizontal plane through a limited angle θ in the direction of the double-pointed arrows 36 and 38.

Referring again to FIG. 1, the motion indicated by the arrow 32 of FIG. 2 is produced by adjusting the vertical position of the shuttle block 22 by rotation of the screw 40 which may be threaded through a stationary upper portion of the mill housing and driven by the right screwdown motor 42 through the agency of a gear reducer 44 in a manner well known to the trade. In a similar manner, the motion indicated by the arrow 30 is produced by operating the left screwdown motor 46. Rotation of the axis 26 of the roll 14 about the vertical axis 34 is allowed by the horizontal motion of bearing blocks 18 and 20, and is effectified by a pair of screws 48 and 50 which are threaded in the shuttle blocks (as at 22) and driven through universal joints 52 and 54. The motion of screws 48 and 50 is actuated by the cross-axis adjusting motor 56 through the agency of gear boxes 58, 60, 62 and 64 which are interconnected by drive shafts 66, 68 and 70. The gearing is arranged in a manner such that when the left bearing block 18 is moved forward, the right block 20 moves to the rear an equal amount and vice-versa.

The thickness-measuring device is preferably of the type described in a co-pending application Serial No. 286,220, filed May 5, 1952, by Henry R. Chope, now U.S. Patent 2,829,268 and basically comprises a detector head 100 together with an indicating and recording instrument 102. The detector head 100 may be mounted on an elongated C-shaped frame 104 equipped with suitable rollers (not shown) on which the frame 104 may travel, to and fro transversely of the strip 10, upon a stationary-mounted rail 106. This traversing movement may be actuated when required by a traversing motor 108, whose operation is controlled by a positioning device 110 operating in conjunction with a mechanically driven potentiometer 112 coupled to the traversing drive mechanism. Potentiometer 112 provides an electrical voltage on line 113 representing the position of the detector 100. Similarly, a continuum of voltages are present across the voltage divider combination of potentiometers 114—118 associated with the positioning device 110 wherefrom a voltage representing a desired position of the detector 100 may be derived. At 120 is a stepping switch actuator device controlled by a timer 122. The timer periodically provides an electrical impulse to the switch actuator 120, causing the same to advance one switch position at predetermined intervals in a well-known manner. Accordingly the switch section 120a, shown in position No. 1 connecting line 124 of the positioner to the tap of potentiometer 114, will advance to position No. 2, remaining therein for an interval before advancing to position No. 3. After another equal interval in position No. 3 the switch is reset to position No. 1, dwelling therein for the duration of another timer interval. This action occurs in a repeating cycle. The positioner 110, which is described fully in the above referenced co-pending application, compares the voltage on line 113 representing the existing position of the detector 100 with the voltage on line 124 representing a desired position thereof in accordance with the setting of potentiometers 114—118 and the position of switch 120a. Whenever these two voltages are not equal, the positioner will energize the traversing motor 108, driving the detector and potentiometer 112 to a position wherein the voltage on line 113 is equalized with the voltage on line 124.

The action of the gauging device is as follows. Assume that switch 120a is located in position No. 1, and that the detector 100 is located at L near the left edge of the strip 10. The thickness of the traveling strip at L is indicated and recorded on the instrument 102. After a predetermined period of measurement in this position, the timer 122 will deliver an impulse to the stepper 120, causing the switch 120a to move to position No. 2 and connecting line 124 to the tap of potentiometer 116. Since the voltage on line 124 is no longer equal to the voltage on line 113, the positioner 110 will energize the motor 108 so as to drive the detector 100 to the right. When the detector reaches point C in the center of the strip 10, the rotation of potentiometer 112 will again equalize the voltages on lines 113 and 126, whereupon the motor 108 will be stopped quickly by the action of the positioner 110. It is clear without further explanation that a similar sequence of measurement and detector relocating occurs at other positions in a repeating cycle. It is also apparent that the exact locations of measuring positions L, C, and R are adjustable respectively by means of potentiometers 114, 116, and 118. It is preferred that measurement and automatic control action be suspended while the detector 100 is in motion between successive measuring positions. Accordingly, while driving power is being furnished to the traversing motor 108 by the positioner 110, the positioner may also deliver a disabling signal to the measuring indicator system 102 as well as to the controller 126 by way of line 128. For example, a signal on line 128 may be used to energize suitable relays in the control and measuring circuits, thereby to interrupt normal operation of the same.

The controller 126 is designed in accordance with principles well known in the industrial control art, and in essence functions as follows. A signal obtained from the measuring indicator 102 represents the thickness of the strip 10 passing beneath the detector head 100. The controller compares this signal with an arbitrary signal representing a desired thickness thereof to obtain an error signal representing the difference. The error signal is monitored by an error sensing circuit which observes the magnitude and direction of the error. If the error exceeds a predetermined magnitude, a relay system is actuated, closing suitable circuits whereby power is applied to a machine adjusting actuator such as one of the motors 42, 46 or 56, so as to readjust the mill in a direction to reduce the error. The amount of correction applied by the actuator motor is automatically determined by the magnitude of the error signal. After a correction has been made, no further correction is permitted until the full results of the first correction can be seen by the gauging device.

In accordance with this invention, the output of the common controller 126 is routed in turn to each of the actuator motors 42, 46 and 56 in accordance with the measuring position of the detector 100. Thus if the stepping switch section 120a has been placed in position No. 1 causing the detector 100 to dwell at position L near the left edge of the strip, switch section 120b in effect channels the controller output to the left screwdown motor 46 via cable 134. Similarly, when the detector 100 is located in center position C, the controller output is routed to the cross-axis control actuator motor 56 via cable 136. Further when the detector is located in position R near the right edge of the strip, the controller output is connected to the right-hand screwdown motor 42 via cable 138. Circuit routing to effect the results described is accomplished by the actuator selector device 130. As is set forth hereinabove, the need for a correction to the cross-axis adjustment cannot be determined, regardless of an error signal when the detector 100 is in position C, unless the strip thickness near the right and left edges is known to be correct. Accordingly the disabling circuit 132 prevents the controller from energizing the cross-axis adjusting motor 56 except at a time when both the right and left edges have been inspected and passed without corrective action, and when an error signal is received when the detector is measuring in the center of strip.

FIG. 3 illustrates suitable circuitry for effecting the functions of the actuator selector 130 and the disabling means 132. These circuits may be powered by the conventional 115 v. A.C. power source represented at 150. Each of the adjusting actuator motors 42, 46 and 56 shown in FIG. 1 is directly controlled by a pair of relays in the group 152—162. Thus relay 152 is the left open relay and relay 158 is the left close relay. When energized, one of these relays will apply power to the left screwdown motor 46 in a manner to raise or lower the left end of roll 14, thereby increasing or decreasing the spacing between the same and the stationary roll 16 so as to increase or decrease the thickness of the strip 10 at the left edge thereof. Similarly the right-hand screwdown motor 42 is controlled by its respective open and close relays 156 and 162, and the cross-axis adjusting motor 56 is controlled by the axis-left relay 154 and axis-right relay 160 in the well known manner.

The actuator motor power relays 152—162 may not be energized except through normally open contacts 166a, 168a, 172a, 166b, 168b and 172b of the position relays 166, 168 and 172. The actual application of power thereto is determined by the action of the controller 126, whose end function is merely to operate the close relay contacts 171a and 171b at the proper time and in the proper manner when the thickness of the strip 10 as seen by the detector 100 is excessive, or to operate the open relay contacts 173a and 173b when it is desirable that the strip thickness be increased. These controller contacts are shown within the dotted line 126. It is seen that if the controller close relay is operated, its contacts 171a will energize one of the power relays 158, 160 or 162 depending on which set of position relay contacts 166b, 168b or 172b happens to be closed. This circuit is completed through contacts 173b of the open relay. Similarly if the controller open relay is operated, its contacts 173a will energize one of the power relays 152, 154 or 156 through whichever set of position relay contacts 166a, 168a or 172a happens to be closed, the circuit being completed through contacts 171b of the close relay. Contacts 171b and 173b are included in the circuit as a safety feature to avoid the possibility that a forward and reverse driving connection to one of the actuator motors might be made simultaneously, with a resulting short circuit thereto.

The position relays 166, 168 and 172 are energized singly and selectively by the switch section 120b of the stepper 120 shown in FIG. 1. It is seen that the left position relay 166 or the right position relay 172 will be energized directly whenever the stepping switch is in position No. 1 or position No. 3, corresponding to a left (L) or right (R) measuring location of the detector 100. The controller is thus permitted to actuate the left or right screwdown motor in the manner described hereinabove. However, when stepping switch section 120b is in position No. 2, corresponding to a center (C) measuring location of the detector, the center position relay 168 is not energized directly, but power to the same must pass through two sets of relay contacts, 174b and 176a, which disable the center position relay whenever in the preceding stepping switch cycle a correction has been made to the setting of the right or left screwdown adjustment.

The disabling circuits function as follows. Whenever a correction is made by the controller, power is applied to line 178 through contacts 171a or 173a. If the correction is made to the left or right screwdown, contacts 166c of the left position relay or contacts 172c of the right position relay will be closed, so that the detector relay 164 will be momentarily energized. Contacts 164a of the detector relay apply power to the hold relay 174 through normally closed contacts 176b of the reset relay 176. Contacts 174a of the hold relay will establish a holding circuit for the relay coil 174, so that relay 174 will remain energized even though contacts 164a are opened. Contacts 174b of the hold relay will be opened also, so that when the stepping switch 120b is placed in position No. 2, the center position relay is prevented from operating, in turn preventing operation of the cross-axis control actuator power relays 154 and 160. Instead, when switch 120b makes its No. 2 contact, pass relay 170 will be energized through contacts 174c of the hold relay, and will establish its own holding circuit through contacts 170a. The reset relay 176 will now be energized through contacts 170b of relay 170. Thereupon contacts 176a of the reset relay open, preventing the center position relay from becoming energized when contacts 176b de-energize the hold relay 174. Relays 170 and 176 will now remain energized as long as switch 120b remains in the position No. 2, during which time the center position relay will be prevented from operating by the held-open contacts 176a of the reset relay. When the switch 120b is transferred to another position, however, power is removed from the pass relay 170, whose contacts 170b will open, in turn de-energizing the reset relay 176. Thus the circuits are restored to the original condition, at the completion of a cycle in the sequence of operation wherein control action to the third adjusting actuator is interrupted. In the event that in the next or a following sequence no corrective action is made by the controller in the right or left position, the detector relay 164 will not be energized to enable the switching routine of the disabling circuits to function. Hence the circuit of the center position relay 168 may be completed through relay contacts 174b and 176a, so that a cross-axis adjustment may be made in accordance with the error signal observed by the controller.

Applications of the invention to other and different types of rolling mills is clearly contemplated; for example, reference can be made in this connection to rolling apparatus such as is described in U.S. Patent No. 2,573,353, issued October 30, 1951, to Henry W. Nieman, or to U.S. Patent No. 2,792,730, issued May 21, 1957, to Giuseppe Cozzo.

For example, in FIG. 4 there is reproduced a portion of FIG. 3 of Patent No. 2,792,730 showing the work rolls and profile control actuator section of Cozzo's mill. In accordance with this invention the plural gauges 28 and controllers 29 of that patent are dispensed with, and the traversing gauge and control system of FIGS. 1 and 3 of the present invention are substituted therefor in a simple and obvious manner. The actuator cylinders 26 of the patent are herein renumbered 226a, 226b and 226c, and the control solenoid valves 30 therefor have been renumbered 230a, 230b and 230c. It is seen that the left 230a and right 230c solenoids are now connected respectively to control signal lines 134 and 138 of the present controller (FIG. 1) while the intermediate solenoid 230b is connected to line 136 thereof. Since the solenoids consume substantially less power than the electric motors 42, 46 and 56, if desired the heavy duty relays 152—162 (FIG. 3), which are in effect amplifiers, may obviously be eliminated, and the solenoids energized directly by the contacts 166a, 168a, 172a, 166b, 168b and 172b.

While the invention has been herein illustrated and described in a specific embodiment associated with a particular type of industrial process and specific machinery, such a showing and description must clearly be taken as merely illustrative of the invention and in no way restrictive to the scope thereof. It will be obvious that a great many changes can be made in the disclosed control apparatus without departing from the scope of the invention as is set forth in the appended claims. Furthermore, the essential principles and basic control apparatus as described may be readily extended to such processes as a knife coating operation, or proceding even beyond the realm of strips, sheets, or webs, it may be adapted to a variety of processes involving a flow of granular or comminuted materials in a process stage wherein a linear dimension should be maintained constant at laterally separated points across the width of said flow.

What is claimed is:

1. Apparatus for automatically maintaining a desired linear dimension profile across the width of a flow of material formed in continuous fashion by co-acting flow regulating elements, comprising means including a first actuator for adjusting said elements at one portion thereof to produce a first value of said linear dimension, means including a second actuator for adjusting a second portion of said elements spaced from said first portion thereof to produce a second value of said linear dimension, means including a third actuator for adjusting a third portion of said elements intermediate said first and second portions to produce a third value of said linear dimension, a single gauging device located on the output side of said flow regulating elements and movable across said width for inspecting said first, second and third dimension values, means for moving said gauging device in repeating sequence to provide an indication of said dimension at said portions, controller means for providing a control signal adapted to energize one of said actuators when said indication deviates from a predetermined value, switching means for routing said control signal successively to the one of said actuators in synchronism with said inspection sequence, and disabling means responsive to a control signal energizing either of said first and second actuators for interrupting the circuit supplying power to said third actuator for the duration of one cycle of said sequence.

2. Apparatus for automatically maintaining a desired thickness profile across the width of an elongated strip formed in continuous fashion between a pair of co-acting cylindrical rolls, comprising means including a first actuator for adjusting the spacing between said rolls at one end thereof to produce a first thickness of a first portion of said strip, means including a second actuator for adjusting the spacing between said rolls at the opposite end thereof to produce a second thickness of a second portion of said strip, means including a third actuator for adjusting the spacing between said ends of said rolls relative to the spacing between a central portion of said rolls intermediate said ends to produce a third thickness of a third portion of said strip intermediate said first and second portions, a single gauging device located on the strip output side of said rolls and movable across said width for inspecting said first, second and third thicknesses, means for moving said gauging device in repeating sequence to provide an indication of the respective values of said thickness, controller means for providing a control signal adapted to energize one of said actuators when said indication deviates from a predetermined value, and switching means for routing said control signal successively to the one of said actuators in synchronism with said inspection sequence.

3. Apparatus for automatically maintaining a desired thickness profile across the width of an elongated strip formed in continuous fashion between a pair of co-acting cylindrical rolls, comprising means including a first actuator for adjusting the spacing between said rolls at one end thereof to produce a first thickness of a first portion of said strip, means including a second actuator for adjusting the spacing between said rolls at the opposite end thereof to produce a second thickness of a second portion of said strip, means including a third actuator for adjusting the spacing between said ends of said rolls relative to the spacing between a central portion of said rolls intermediate said ends to produce a third thickness of a third portion of said strip intermediate said first and second portions, a gauging device located on the strip output side of said rolls for inspecting said first, second and third thicknesses in repeating sequence to provide an indication of the respective values thereof, controller means responsive to an error in said indication for providing a control signal adapted to energize one of said actuators when said indication deviates from a predetermined value, switching means for routing said control signal successively to the one of said actuators in synchronism with said inspection sequence, and disabling means activated by a control signal energizing either of said first and second actuators for interrupting the circuit supplying power to said third actuator for the duration of one cycle of said sequence.

4. Apparatus for automatically maintaining a desired thickness profile across the width of an elongated strip formed in continuous fashion between a pair of co-acting cylindrical rolls, comprising means including a first actuator for adjusting the spacing between said rolls at one end thereof, means including a second actuator for adjusting the spacing between said rolls at the opposite end thereof, means including a third actuator for adjusting the spacing between said ends of said rolls relative to the spacing between a central portion of said rolls intermediate said ends, a gauging device located on the strip output side of said rolls for providing an indication of the thickness of said strip, controller means responsive to an error in said thickness indication for providing a control signal adapted to energize one of said actuators when said thickness indication deviates from a predetermined value, a traversing mount for said gauging device permitting traversing movement of the same laterally of said strip across the width thereof, driving means for actuating said traversing movement; positioning means responsive to first, second and third predetermined measuring positions of said gauging device corresponding respectively to first, that edge region of said strip which is formed by the portion of said rolls adjacent said one end thereof, second, the opposite edge region of said strip and third, a region intermediate said first and second regions for controlling the application of power to said driving means to start, stop, and reverse the same; a periodically advancing switching means associated with said positioning means for routing a plurality of circuits in a repeating sequence of first, second and third conditions corresponding to said first, second and third positions of said gauging device, said first condition routing said control signal to said first actuator, said second condition routing said control signal to said second actuator and said third condition routing said control signal to said third actuator.

5. Apparatus for automatically maintaining a desired thickness profile across the width of an elongated strip formed in continuous fashion between a pair of co-acting cylindrical rolls, comprising means including a first actuator for adjusting the spacing between said rolls at one end thereof, means including a second actuator for adjusting the spacing between said rolls at the opposite end thereof, means including a third actuator for adjusting the spacing between said ends of said rolls relative to the spacing between a central portion of said rolls intermediate said ends, a gauging device located on the strip output side of said rolls for providing an indication of the thickness of said strip, controller means responsive to an error in said thickness for providing a control signal adapted to energize one of said actuators when said thickness indication deviates from a predetermined value, a traversing mount for said gauging device permitting traversing movement of the same laterally of said strip across the width thereof, driving means for actuating said traversing movement; positioning means responsive to first, second and third predetermined measuring positions of said gauging device corresponding respectively to first, that edge region of said strip which is formed by the portion of said rolls adjacent said one end thereof, a second, the opposite edge region of said strip and third, a region intermediate said first and second regions for controlling the application of power to said driving means to start, stop, and reverse the same; a periodically advancing switching means associated with said positioning means for routing a plurality of circuits in a repeating sequence of first, second and third conditions corresponding to said first, second and third positions of said gauging device, said first condition routing said control signal to said first actuator, said second condition routing said control signal to said second actuator and said third condition routing said control signal to said third actuator, and disabling means responsive to a control signal energizing either of said first and second actuators for interrupting the circuit supplying power to said third actuator for the duration of one cycle of said sequence.

6. Apparatus for automatically maintaining a desired linear dimension profile across the width of a flow of material formed in continuous fashion by co-acting flow regulating elements, comprising means including a first actuator for adjusting said elements at one portion thereof to produce a first value of said linear dimension, means including a second actuator for adjusting a second portion of said elements spaced from said first portion thereof to produce a second value of said linear dimension, means including a third actuator for adjusting a third portion of said elements intermediate said first and second portions to produce a third value of said linear dimension, a single gauging device located on the output side of said flow regulating elements and movable across said width for inspecting said first, second and third dimension values, drive means for moving said gauging device, a programmed positioning control device having first and second control sections, said first section controlling said drive means to cause said gauging device to move to said portions in repeating sequence to provide an indication of the one of said dimension values corresponding to the position of said gauging device, process controller means for providing a control signal adapted to energize one of said actuators when said indication deviates from a predetermined value, and stepping switch means actuated by said second control section of said programmed positioning control device for routing said control signal successively to the one of said actuators in synchronism with the position of said gauging device in said inspection sequence.

References Cited in the file of this patent

UNITED STATES PATENTS

| | | |
|---|---|---|
| 1,860,931 | Keller | May 31, 1932 |
| 2,677,978 | Dahlstrom | May 11, 1954 |
| 2,750,986 | Russell et al. | June 19, 1956 |
| 2,792,730 | Cozzo | May 21, 1957 |
| 2,829,268 | Chope | Apr. 1, 1958 |

Disclaimer 3,006,225.—*Leo G. Mamas*, Columbus, Ohio. SPECIAL MILL CONTROLS. Patent dated Oct. 31, 1961. Disclaimer filed March 19, 1964, by the assignee, *Industrial Nucleonics Corporation*.

Hereby enters this disclaimer to claims 2, 4 and 6 of said patent.

[*Official Gazette June 16, 1964.*]